(12) United States Patent
Chuang et al.

(10) Patent No.: US 8,654,295 B2
(45) Date of Patent: Feb. 18, 2014

(54) PIXEL STRUCTURE

(75) Inventors: Young-Ran Chuang, Tainan (TW); Ching-Huan Lin, Hsinchu County (TW); Chu-Yu Liu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 393 days.

(21) Appl. No.: 13/075,185

(22) Filed: Mar. 30, 2011

(65) Prior Publication Data

US 2012/0162157 A1    Jun. 28, 2012

(30) Foreign Application Priority Data

Dec. 28, 2010  (TW) ................................ 99146385 A

(51) Int. Cl.
*G02F 1/1343* (2006.01)

(52) U.S. Cl.
USPC ......................................................... 349/141

(58) Field of Classification Search
USPC ......................................................... 349/141
See application file for complete search history.

(56) References Cited

U.S. PATENT DOCUMENTS

| 6,924,864 | B2 | 8/2005 | Kim | |
|---|---|---|---|---|
| 8,223,305 | B2 * | 7/2012 | Park et al. | ...................... 349/129 |
| 2009/0153761 | A1 | 6/2009 | Park et al. | |
| 2011/0316843 | A1 | 12/2011 | Sakurai et al. | |

FOREIGN PATENT DOCUMENTS

| JP | 2010164939 | 7/2010 |
|---|---|---|
| WO | 2010137209 | 12/2010 |

OTHER PUBLICATIONS

"Office Action of Taiwan Counterpart Application", issued on Sep. 9, 2013, p. 1-p. 6.

* cited by examiner

*Primary Examiner* — James Dudek
(74) *Attorney, Agent, or Firm* — Jianq Chyun IP Office

(57) ABSTRACT

A pixel structure includes a scan line, a first data line, a second data line, a first active device, a second active device, a first pixel electrode, a second pixel electrode, a common line, and a first capacitance upper electrode. The first and the second data lines intersect the scan line. The common line is parallel to the scan line. The first pixel electrode is electrically connected to the first data line through the first active device. The second pixel electrode is electrically connected to the second data line through the second active device. A difference between a first voltage of the first pixel electrode and a second voltage of the second pixel electrode constitutes a driving electric field to drive a display medium. The first capacitance upper electrode is electrically connected to the first pixel electrode and located above the common line to form a first storage capacitor.

13 Claims, 5 Drawing Sheets

PIXEL STRUCTURE

CROSS-REFERENCE TO RELATED APPLICATION

This application claims the priority benefit of Taiwan application serial no. 99146385, filed Dec. 28, 2010. The entirety of the above-mentioned patent application is hereby incorporated by reference herein and made a part of this specification.

BACKGROUND OF THE INVENTION

1. Field of the Invention

The invention relates to a pixel structure and more particularly to a pixel structure which can supply a large driving electric field.

2. Description of Related Art

With vigorous development of display technologies, consumers' requirements for favorable performance of displays have been increasing. Specifically, consumers have high demands for the response time of the displays in addition to the requirements for resolution, contrast ratio, viewing angle, grey level inversion, and color saturation.

To satisfy said requirements, blue phase liquid crystal displays (LCDs) characterized by fast response speed have been developed in the industry pertinent to displays. For instance, when a positive blue phase liquid crystal material is applied, a transversal electric field is required for operation, such that the positive blue phase liquid crystal material can function as a light valve. At this current stage, positive blue phase liquid crystal molecules in the blue phase LCD are driven by adopting the electrode design of an in-plane switching (IPS) display panel or a fringe field switching (FFS) display panel.

However, the blue phase liquid crystal molecules need to be driven with large driving voltages, so as to show gray level variations. The driving chip used in the IPS display panel or the FFS display panel can merely withstand approximately 10-volt voltage difference at present. To drive the blue phase liquid crystal molecules when the positive driving electric field and the negative driving electric field are alternately applied, the voltage difference cannot exceed 10 volts, and thus the blue phase liquid crystal molecules cannot be effectively driven. Hence, a new driving chip needs be developed or purchased, which leads to an increase in costs.

SUMMARY OF THE INVENTION

The invention is directed to a pixel structure in which a relatively large driving electric field can be generated for driving a display medium.

In an embodiment of the invention, a pixel structure for driving a display medium is provided. The pixel structure includes a scan line, a first data line, a second data line, a first active device, a second active device, a first pixel electrode, a second pixel electrode, a common line, and a first capacitance upper electrode. The first data line intersects the scan line. The second data line intersects the scan line as well. The first active device is electrically connected to the first data line. The second active device is electrically connected to the second data line. The first pixel electrode is electrically connected to the first active device. The second pixel electrode is electrically connected to the second active device. The first pixel electrode and the second pixel electrode are located between the first data line and the second data line, and a difference between a first voltage of the first pixel electrode and a second voltage of the second pixel electrode constitutes a driving electric field for driving the display medium. The common line is parallel to the scan line. The first capacitance upper electrode is electrically connected to the first pixel electrode and located above the common line to form a first storage capacitor.

Based on the above, in the pixel structure described in the embodiments of the invention, the first voltage of the first pixel electrode and the second voltage of the second pixel electrode can constitute the driving electric field for driving the display medium. The intensity of the driving electric field can be substantially equal to the maximum voltage difference which can be withstood by the driving chip. Hence, the pixel structure can have an intensified driving electric field for driving various types of display media. In particular, when the display medium requires a relatively large driving electric field, the driving electric field supplied by the pixel structure as described in the embodiments of the invention can drive the display medium without modifying the configuration of the driving chip.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 1:
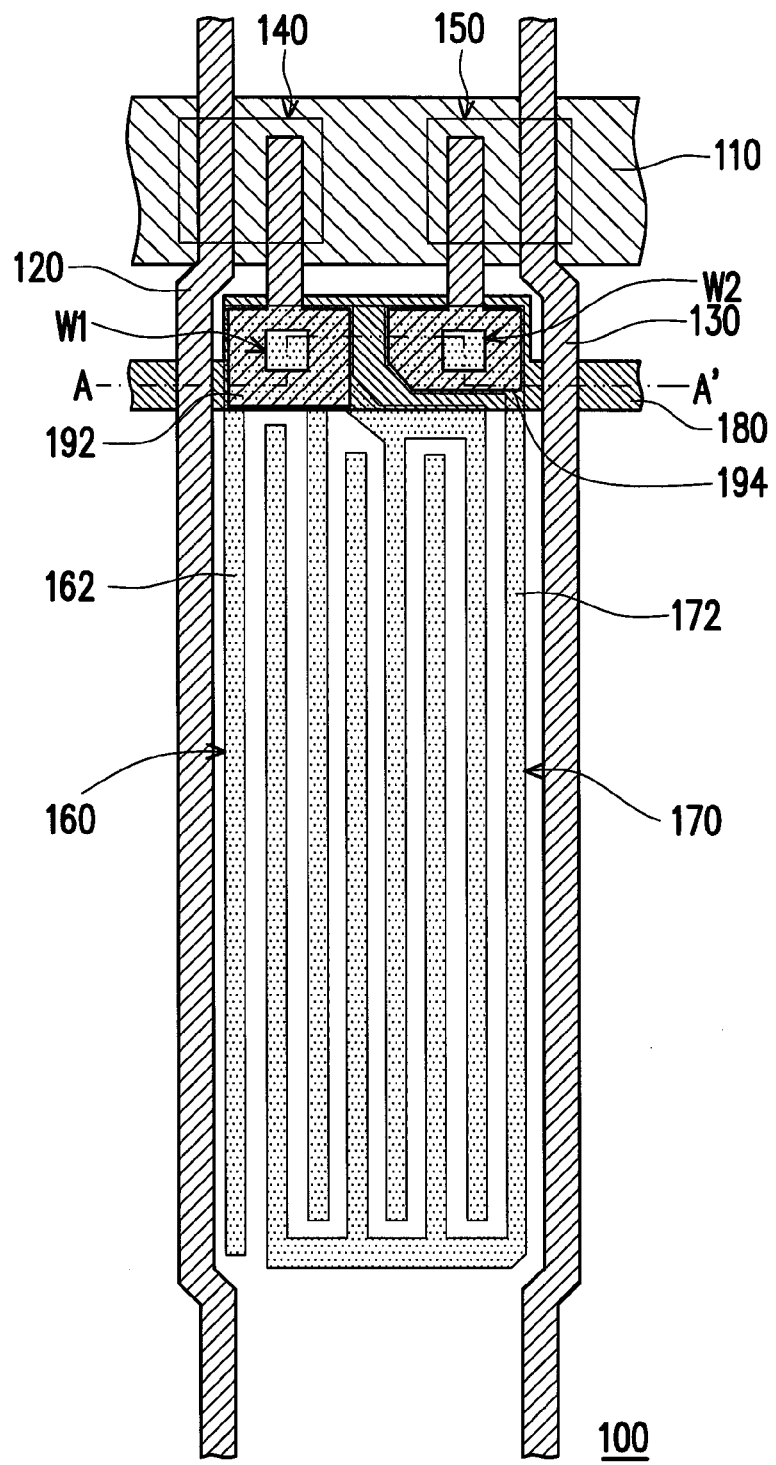
FIG. 1 is a schematic view illustrating a pixel structure according to a first embodiment of the invention.

FIG. 1 is a schematic view illustrating a pixel structure according to a first embodiment of the invention. With reference to FIG. 1, the pixel structure 100 includes a scan line 110, a first data line 120, a second data line 130, a first active device 140, a second active device 150, a first pixel electrode 160, a second pixel electrode 170, and a common line 180. The first data line 120 intersects the scan line 110. The second data line 130 intersects the scan line 110 as well. The scan line 110 is employed to drive the first active device 140 and the second active device 150. The first active device 140 is electrically connected to the first data line 120, and the second active device 150 is electrically connected to the second data line 130. The first pixel electrode 160 and the second pixel electrode 170 are located between the first data line 120 and the second data line 130. In addition, the first pixel electrode 160 is electrically connected to the first active device 140, and the second pixel electrode 170 is electrically connected to the second active device 150. The common line 180 is parallel to the scan line 110.

In this embodiment, the first pixel electrode 160 includes a plurality of first stripe portions 162, for instance, and the second pixel electrode 170 includes a plurality of second stripe portions 170, for instance. Here, the first stripe portions 162 and the second stripe portions 172 are alternately arranged. One of the second stripe portions 172 is configured between any two adjacent first stripe portions 162. Similarly, one of the first stripe portions 162 is configured between any two adjacent second stripe portions 172. That is to say, the first pixel electrode 160 and the second pixel electrode 170 are respectively formed by comb-shaped patterns, and this configuration is the same as the electrode arrangement of the IPS display pixels.

Specifically, the pixel structure 100 can be configured in a display panel (not shown) for driving a display medium of the display panel. When the pixel structure 100 performs a display function, the first pixel electrode 160 and the second pixel electrode 170 can respectively receive the voltages transmitted by the first data line 120 and the second data line 130. Here, the first pixel electrode 160 has a first voltage, and the second pixel electrode 170 has a second voltage, for instance. The difference between the first voltage and the second voltage can constitute the driving electric field for driving the display medium.

Since the first data line 120 and the second data line 130 can be connected to the same driving chip, the first voltage and the second voltage can respectively fall within the range of the maximum voltage and the minimum voltage which can be output by the driving chip. Hence, the greatest difference between the first and second voltages is substantially equal to the maximum voltage difference that can be withstood by the driving chip. For instance, when the voltage that can be output by the driving chip ranges from about 0 volt to about 10 volts, the greatest difference between the first and second voltages can be 10 volts. When the maximum voltage that can be output by the driving chip is greater than 10 volts, the difference between the first and second voltages can be greater than 10 volts. Namely, the first pixel electrode 160 and the second pixel electrode 170 can constitute the driving electric field greater than 10 volts.

By contrast, in the conventional IPS display pixel, one of the first pixel electrode 160 and the second pixel electrode 170 receives a common voltage, and the other receives the voltage output by the driving chip. Hence, the common voltage is set at 5 volts. When the voltage that can be output by the driving chip ranges from about 0 volt to about 10 volts, the greatest difference between the first and second voltages is 5 volts approximately in order to drive the display medium under the positive driving electric field and the negative driving electric field that are alternately applied. The pixel structure 100 described in the embodiment of the invention can however, provide a relatively large driving electric field for driving the display medium. As such, when a relatively large driving electric field is required for driving the display medium due to certain properties of the display medium, the display medium can be effectively driven by the driving electric field supplied by the pixel structure 100 for image display in no need of modifying the configuration of the driving chip. For instance, the driving electric field supplied by the pixel structure 100 can drive the display medium with a high dielectric constant, e.g., the blue phase liquid crystal material. The driving electric field supplied by the pixel structure 100 can certainly drive other liquid crystal materials or other display media, which should not be construed as a limitation to the invention.

Besides, the common line 180 is located at one side of the first pixel electrode 160 close to the scan line 110 and at one side of the second pixel electrode 170 close to the scan line 110. Namely, the common line 180 and the scan line 110 are adjacent to each other, and the common line 180 is located at the peripheries of the first pixel electrode 160 and the second pixel electrode 170. In this embodiment, the scan line 110 and the common line 180 can be formed by the same conductive material layer. When the scan line 110 and the common line 180 are made of opaque conductive materials, such as metal, metal stacked layers, or alloy, the opaque scan line 110 and the opaque common line 180 are located at the periphery of the pixel structure 100, which is thus not apt to negatively affect the display aperture ratio of the pixel structure 100.

Figure 2:
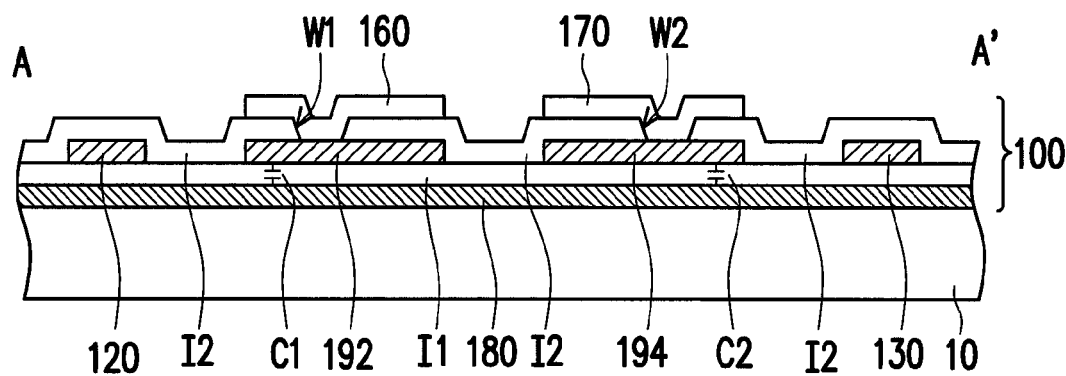
FIG. 2 is a schematic cross-sectional view taken along a section line A-A' depicted in FIG. 1.

FIG. 2 is a schematic cross-sectional view taken along a section line A-A' depicted in FIG. 1. With reference to FIG. 1 and FIG. 2, the pixel structure 100 is configured on a substrate 10, for instance. In addition to the above-mentioned components, the pixel structure 100 further includes insulation layers I1 and I2, a first capacitance upper electrode 192, and a second capacitance upper electrode 194. As shown in the cross-sectional view taken alone the section line A-A', the insulation layer I1 covers the common line 180, and the insulation layer I2 is located on the insulation layer I1 and covers the first data line 120, the second data line 130, the first capacitance upper electrode 192, and the second capacitance upper electrode 194. Besides, the first capacitance upper electrode 192 and the second capacitance upper electrode 194 are both located above the common line 180. The first capacitance upper electrode 192 and the common line 180 together constitute a first storage capacitor C1, and the second capacitance upper electrode 194 and the common line 180 together constitute a second storage capacitor C2.

The insulation layer I2 has a first contact window W1 and a second contact window W2, for instance. The first contact window W1 and the second contact window W2 respective expose the first capacitance upper electrode 192 and the second capacitance upper electrode 194. Thereby, the first pixel electrode 160 is electrically connected to the first capacitance upper electrode 192 though the first contact window W1, and the second pixel electrode 170 is electrically connected to the second capacitance upper electrode 194 through the second contact window W2. Hence, when the pixel structure 100 is applied to drive the display medium, the first storage capacitor C1 and the second storage capacitor C2 can maintain the display voltages of the first pixel electrode 160 and the second pixel electrode 170.

It can be observed from the top view of the pixel structure 100 that the first capacitance upper electrode 192 and the second capacitance upper electrode 104 are respectively connected to the first active device 140 and the second active device 150. Hence, the first pixel electrode 160 is electrically connected to the first active device 140 through the first contact window W1, and the second pixel electrode 170 is electrically connected to the second active device 150 through the second contact window W2. That is to say, in this embodiment, it is not necessary to electrically connect the first pixel electrode 160 to the first active device 140 and the first capacitance upper electrode 192 through different contact windows, respectively, nor is it necessary to electrically connect the second pixel electrode 170 to the second active device 150 and the second capacitance upper electrode 194 through different contact windows, respectively. Thereby, the number and the area of the contact windows W1 and W2 can be reduced in this embodiment, which is conducive to an increase in the display aperture ratio of the pixel structure 100.

In addition, when the thickness of the insulation layer 12 between the pixel electrodes 160 and 170 and the capacitance upper electrodes 192 and 194 increases, the area of the first contact window W1 and the area of the second contact window W2 need to be expanded, so as to ensure the electrical connection between the pixel electrodes 160 and 170 and the capacitance upper electrodes 192 and 194. In this embodiment, the first contact window W1 and the second contact window W2 are located at the periphery of the pixel structure 100 and thus are not apt to negatively affect the display area of the first and second pixel electrodes 160 and 170. As such, the pixel structure 100 can have a favorable display aperture ratio.

Figure 3:
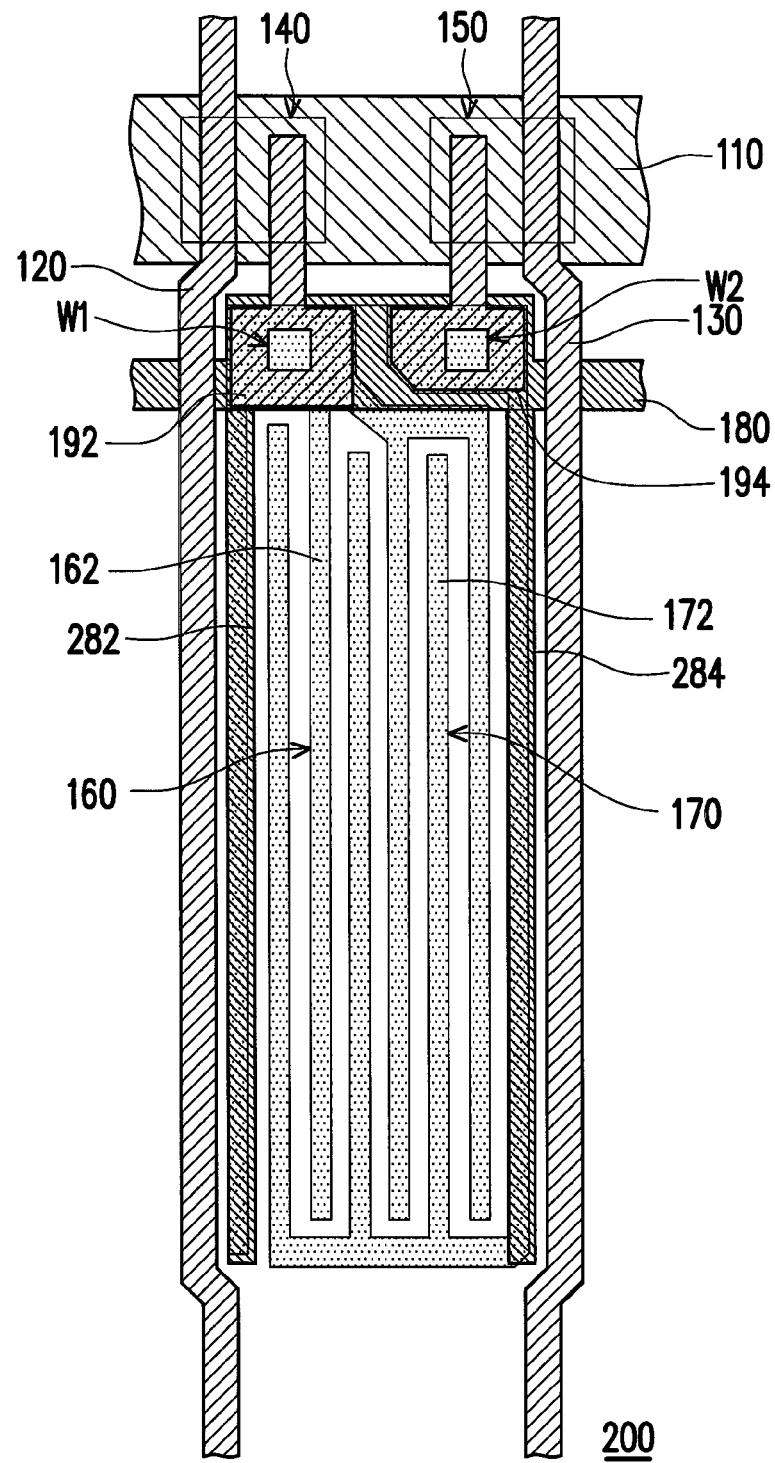
FIG. 3 is a schematic top view illustrating a pixel structure according to a second embodiment of the invention.

FIG. 3 is a schematic top view illustrating a pixel structure according to a second embodiment of the invention. With reference to FIG. 3, the pixel structure 200 is approximately the same as the pixel structure 100, and thus the same elements in the pixel structures 100 and 200 are marked by the same reference numbers. Specifically, the difference between the pixel structures 100 and 200 lies in that the common line 180 of the pixel structure 200 further includes a first branch 282 and a second branch 284. The first branch 282 is close to the first data line 120, and the second branch 284 is close to the second data line 130. In addition, the first branch 282 is overlapped with a first longitudinal portion 162 of the first pixel electrode 160 close to the first data line 120, and the second branch 284 is overlapped with a second longitudinal portion 172 of the second pixel electrode 170 close to the second data line 130. The first branch 282 and the second branch 284 are conducive to an increase in the capacitance of the first storage capacitor and the second storage capacitor.

In the pixel structure 200 of this embodiment, the first pixel electrode 160 and the second pixel electrode 170 are respectively connected to the first active device 140 and the second active device 150, so as to respectively receive the voltages transmitted by the first data line 120 and the second data line 130. Therefore, the driving electric field generated by the first pixel electrode 160 and the second pixel electrode 170 can be increased or decreased in response to specific requirements. Here, the intensity of the driving electric field can reach the maximum voltage difference that can be withstood by the driving chip. As such, the pixel structure 200 can be used to drive the display medium with a high dielectric constant or the common display medium. It is not necessary to change the driving chip with different configurations in order to generate the required driving electric fields. Thereby, costs of purchasing or developing another driving chip can be saved.

Figure 4:
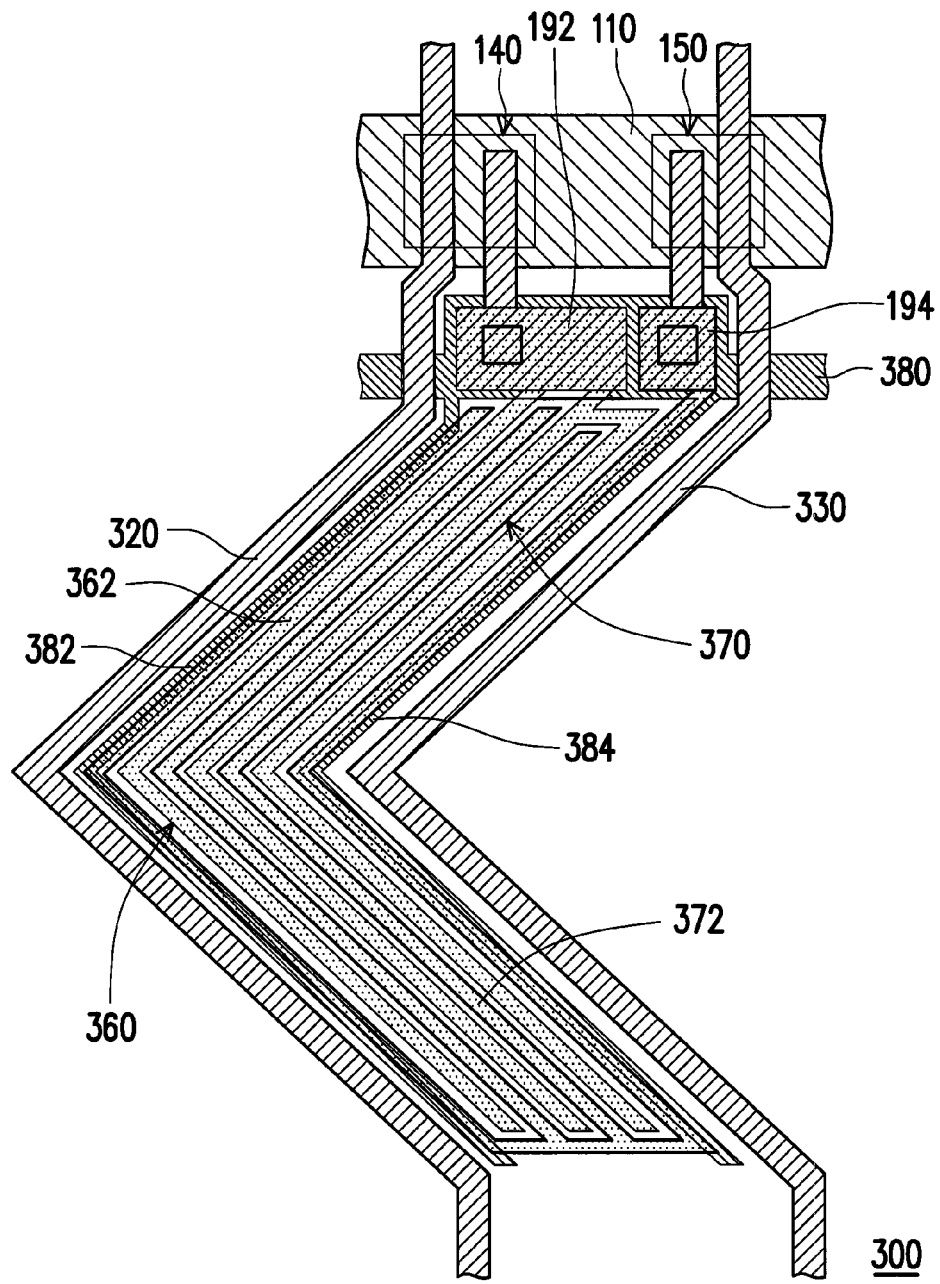
FIG. 4 is a schematic top view illustrating a pixel structure according to a third embodiment of the invention.

FIG. 4 is a schematic top view illustrating a pixel structure according to a third embodiment of the invention. With reference to FIG. 4, the pixel structure 300 includes a scan line 110, a first data line 320, a second data line 330, a first active device 140, a second active device 150, a first pixel electrode 360, a second pixel electrode 370, and a common line 380. The first data line 320 intersects the scan line 110. The second data line 330 intersects the scan line 110. The scan line 110 is employed to drive the first active device 140 and the second active device 150. The first active device 140 is electrically connected to the first data line 320, and the second active device 150 is electrically connected to the second data line 330. The first pixel electrode 360 and the second pixel electrode 370 are located between the first data line 320 and the second data line 330. In addition, the first pixel electrode 360 is electrically connected to the first active device 140, and the second pixel electrode 370 is electrically connected to the second active device 150. The common line 380 is parallel to the scan line 110.

In this embodiment, the first data line 320 and the second data line 330 have a zigzag shape, respectively. A plurality of first stripe portions 362 of the first pixel electrode 360 and a plurality of second stripe portions 372 of the second pixel electrode 370 are distributed and extended conformally along the first and second data lines 320 and 330, for instance. Namely, the distance between each of the first stripe portions 362 and the first data line 320 substantially remains constant. Accordingly, when the extension direction of the first data line 320 is changed, extension directions of the first stripe portions 362 are changed as well. Certainly, the distance between each of the first stripe portions 362 and the second data line 330 also remains constant, such that the first stripe portions 362 can be distributed conformally along the first data line 320 and the second data line 330. Likewise, the distance between each of the second stripe portions 372 and the first data line 320 and the distance between each of the second stripe portions 372 and the second data line 330 remain constant. In a word, the first stripe portions 362 and the second stripe potions 372 are formed in a zigzag shape, respectively.

To be more specific, the first data line 320 and the second data line 330 are arranged in a zigzag manner in this embodiment. Hence, the first data line 320 and the second data line 330 respectively have oblique portions. The first stripe portions 362 of the first pixel electrode 360 and the second stripe portions 372 of the second pixel electrode 370 are substantially arranged conformally along the oblique portions. As such, when the pixel structure 300 is applied to the display panel, different alignment regions can be defined, such that the display panel can achieve the wide-viewing-angle display effect. In other words, the first pixel electrode 360 and the second pixel electrode 370 that are arranged in the zigzag manner can expand the viewing-angle display range of the pixel structure 300.

In an embodiment of the invention, the oblique portion of the first data line 320 and the scan line 110 can form a 45-degree included angle therebetween. Similarly, a 45-degree included angle can also be formed between the oblique portion of the second data line 330 and the scan line 110. However, the included angles can have any other value except for 90 degrees and are not limited in the invention. Besides, the first data line 320, the second data line 330, the first pixel electrode 360, and the second pixel electrode 370 are arranged in a zigzag ("V") manner according to this embodiment. In other embodiments of the invention, the first data line 320, the second data line 330, the first pixel electrode 360, and the second pixel electrode 370 can be arranged in an "N" manner, a "W" manner, or have other arrangements.

Besides, the common line 380 of this embodiment can have a first branch 382 and a second branch 384. The first branch 382 is close to the first data line 320, and the second branch 384 is close to the second data line 330, for instance. In addition, the first and second branches 382 and 384 are distributed conformally along the first and second data lines 320 and 330. Hence, the first and second branches 382 and 384 are in a bending state, or a zigzag state.

It should be mentioned that the first and second branches 382 and 384 are overlapped with the second pixel electrode 370, which is conducive to an increase in the storage capacitance between the second pixel electrode 370 and the common line 380. Hence, the first capacitance upper electrode 192 connected to the first pixel electrode 360 can selectively have greater area than the second capacitance upper electrode 194 connected to the second pixel electrode 370 in this embodiment, such that the storage capacitance coupled to the first pixel electrode 360 is substantially the same as the storage capacitance coupled to the second pixel electrode 370. In other embodiments of the invention, the first and second branches 382 and 384 can be selectively overlapped with the first and second pixel electrodes 360 and 370, respectively, which should not be construed as a limitation to the invention.

In the pixel structure 300 of this embodiment, the first pixel electrode 360 and the second pixel electrode 370 are respectively connected to the first active device 140 and the second active device 150, so as to respectively receive the voltages transmitted by the first data line 320 and the second data line 330. Therefore, the driving electric field generated by the first pixel electrode 360 and the second pixel electrode 370 can be increased or decreased in response to specific requirements. As such, the pixel structure 300 can be used to drive the display medium with a high dielectric constant or the common display medium. It is not necessary to change the driving chip with different configurations in order to generate different driving electric fields. Thereby, costs of purchasing or developing another driving chip can be saved.

Figure 5:
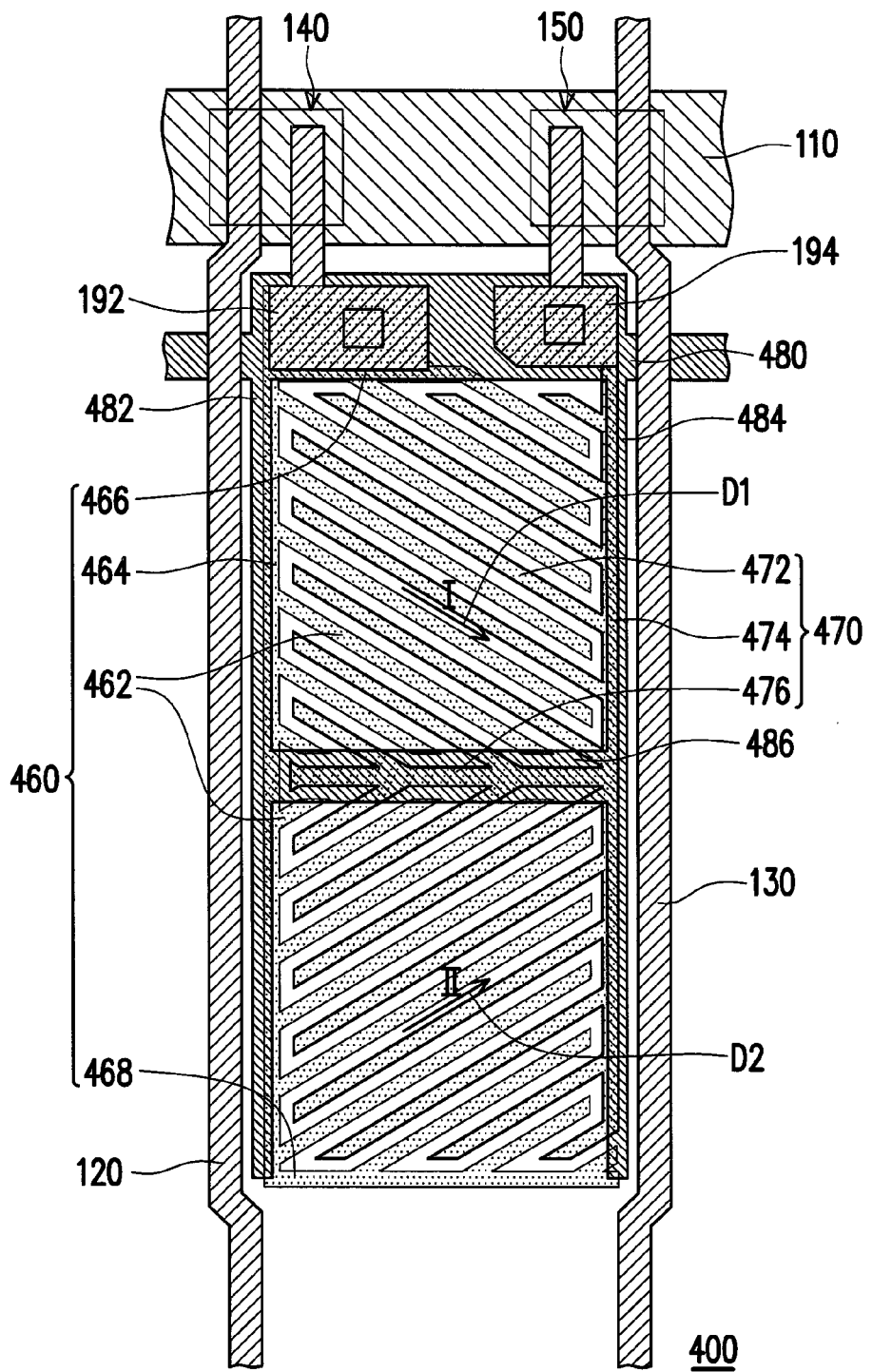
FIG. 5 is a schematic top view illustrating a pixel structure according to a fourth embodiment of the invention.

FIG. 5 is a schematic top view illustrating a pixel structure according to a fourth embodiment of the invention. With reference to FIG. 5, the pixel structure 400 includes a scan line 110, a first data line 120, a second data line 130, a first active device 140, a second active device 150, a first pixel electrode 460, a second pixel electrode 470, and a common line 480. The first data line 120 intersects the scan line 110. The second data line 130 intersects the scan line 110 as well. The scan line 110 is employed to drive the first active device 140 and the second active device 150. The first active device 140 is electrically connected to the first data line 120, and the second active device 150 is electrically connected to the second data line 130. The first pixel electrode 460 and the second pixel electrode 470 are located between the first data line 120 and the second data line 130. In addition, the first pixel electrode 460 is electrically connected to the first active device 140, and the second pixel electrode 470 is electrically connected to the second active device 150. The common line 480 is parallel to the scan line 110.

This embodiment is similar to the first embodiment, while the difference therebetween lies in the pattern design of the first pixel electrode 460, the second pixel electrode 470, and the common line 480. Hence, in the pixel structure 400 of this embodiment, the first pixel electrode 460 and the second pixel electrode 470 are respectively connected to the first active device 140 and the second active device 150, so as to respectively receive the voltages transmitted by the first data line 120 and the second data line 130. The driving electric field generated by the first pixel electrode 460 and the second pixel electrode 470 can be increased or decreased in response to specific requirements. Here, the intensity of the driving electric field can reach the maximum voltage difference that can be withstood by the driving chip. As such, the pixel structure 400 can be used to drive the display medium with a high dielectric constant or the common display medium. It is not necessary to change the driving chip with different configurations in order to generate different driving electric fields. Thereby, costs of purchasing or developing another driving chip can be saved.

Particularly, the first pixel electrode 460 of this embodiment includes a plurality of first stripe portions 462, a first longitudinal connection portion 464, and two first transversal connection portions 466 and 468. The first longitudinal connection portion 464 is located between the first stripe portions 462 and the first data line 120 and is substantially parallel to the first data line 120. The two transversal connection portions 466 and 468 are connected to the first longitudinal connection portion 464 and are substantially parallel to the scan line 110. Besides, the two transversal connection portions 466 and 468 are located at one side of the first stripe portions 462 close to the scan line 110 and the other side of the first stripe portions 462 away from the scan line 110, respectively. In detail, a portion of the first stripe portions 462 is connected to the first longitudinal connection portion 464, and the other portion of the first stripe portions 462 is connected to the two transversal connection portions 466 and 468. According to other embodiments of the invention, the number of the first transversal connection portions 466 and 468 can be singular, so as to connect all of the first stripe portions 462 together.

The second pixel electrode 470 includes a plurality of second stripe portions 472, a second longitudinal connection portion 474, and a second transversal connection portion 476. The second longitudinal connection portion 474 is located between the second stripe portions 472 and the second data line 130 and is substantially parallel to the second data line 130. The second transversal connection portion 476 is connected to the second longitudinal connection portion 474 and is substantially parallel to the scan line 110. A portion of the second stripe portions 472 is connected to the second longitudinal connection portion 474, and the other portion of the second stripe portions 472 is connected to the second transversal connection portion 476.

The second transversal connection portion 476 divides the pixel structure 400 into two alignment regions I and II. The alignment region I is located between the second transversal portion 476 and the scan line 110, and the alignment region II is located at one side of the second transversal portion 476 away from the scan line 110. The first stripe portions 462 and the second stripe portions 472 in the alignment region I are extended along a first direction D1 and alternately arranged, for instance. The first stripe portions 462 and the second stripe portions 472 in the alignment region II are extended along a second direction D2 and alternately arranged, for instance. The first direction D1 and the second direction D2 are not parallel to each other, such that the pixel structure 400 can achieve a wide-viewing-angle effect during image display.

In this embodiment, given the extension direction of the scan line 110 serves as a basis line for conducting a clockwise measurement, the first direction D1 and the scan line 110 can form a 45-degree included angle therebetween, and the second direction D2 and the scan line can form a 135-degree included angle therebetween. In other embodiments of the invention, the aforesaid included angles can be modified based on different design concepts, which should not be construed as a limitation of the invention.

Additionally, in this embodiment, the common line 480 has a first branch 482, a second branch 484, and a transversal branch 486. The first branch 482 is close to the first data line 120, and the second branch 484 is close to the second data line 130. The transversal branch 486 is connected between the first and second branches 482 and 484. That is to say, the first branch 482, the second branch 484, and the transversal branch 486 are shaped as a letter H.

The first transversal connection portion 466 is located above a main portion (parallel to the scan line 110) of the common line 480 and overlapped with the main portion of the common line 480, for instance. Nevertheless, in an alternative embodiment of the invention, the first transversal connection portion 466 is not overlapped with the main portion of the common line 480. The first branch 482 of the common line 480 is overlapped with the first longitudinal connection portion 464 of the first pixel electrode 460, for instance. The first transversal connection portion 466 and the first longitudinal portion 464 are overlapped with the common line 480, which is conducive to an increase in the storage capacitance between the first pixel electrode 460 and the common line 480.

Similarly, the second branch 484 of the common line 480 is overlapped with the second longitudinal connection portion 474, for instance, and the transversal branch 486 of the common line 480 is overlapped with the second transversal connection portion 476 of the second pixel electrode 470, for instance. As such, the second branch 484 and the transversal branch 486 are overlapped with the second pixel electrode 470, which is conducive to an increase in the storage capacitance between the second pixel electrode 470 and the common line 480. When the pixel structure 400 performs a display function, the increased storage capacitance can help maintain the display voltages of the first pixel electrode 460 and the second pixel electrode 470.

To be more specific, in this embodiment, the overlapping area of the second transversal connection portion 476 and the common line 480 is greater than the overlapping area of the first transversal connection portion 466 and the common line 480. Accordingly, the first capacitance upper electrode 192 connected to the first pixel electrode 460 can be greater than the second capacitance upper electrode 194 connected to the second pixel electrode 470, such that the storage capacitance coupled to the first pixel electrode 460 is substantially the same as the storage capacitance coupled to the second pixel electrode 470. In other embodiments of the invention, the storage capacitance can be adjusted based on the actual design, and thus the overlapping area of the first pixel electrode 460 and the common line 480 is not limited to be the same as or proportional to the overlapping area of the second pixel electrode 470 and the common line 480.

In light of the foregoing, the first pixel electrode and the second pixel electrode in the same pixel structure are respectively connected to different data lines through different active devices. Hence, when the pixel structure performs the display function, the two pixel electrodes can respectively receive the voltages transmitted through the data lines. The driving electric field generated by the two pixel electrodes can reach the maximum voltage difference which can be withstood by the driving chip. Therefore, when the same driving chip connecting the conventional pixel structure is applied to connect the pixel structure of the invention, the pixel structure of the invention can supply a relatively large driving electric field. As such, the pixel structure can be used to drive not only the common display medium but also the display medium with a high dielectric constant. Namely, when the pixel structure of this invention is applied, various types of display media can be effectively driven, and it is not necessary to modify the configuration of the driving chip when the display medium requires a relatively high driving voltage.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A pixel structure, comprising:
a scan line;
a first data line intersecting the scan line;
a second data line intersecting the scan line;
a first active device electrically connected to the first data line;
a second active device electrically connected to the second data line;
a first pixel electrode electrically connected to the first active device;
a second pixel electrode electrically connected to the second active device, the first pixel electrode and the second pixel electrode being located between the first data line and the second data line, a difference between a first voltage of the first pixel electrode and a second voltage of the second pixel electrode constituting a driving electric field to drive a display medium;
a common line;
a first capacitance upper electrode electrically connected to the first pixel electrode and located above the common line to form a first storage capacitor; and
an insulation layer located between the first capacitance upper electrode and the first pixel electrode, wherein the insulation layer has a first contact window which is overlapped with the common line, the first contact window exposes the first capacitance upper electrode, and the first capacitance upper electrode is electrically connected to the first pixel electrode via the first contact window.

2. The pixel structure as claimed in claim 1, wherein the difference between the first voltage and the second voltage is greater than 10 volts, a material of the display medium comprises a blue phase liquid crystal material, and the first capacitance upper electrode is connected to the first active device.

3. The pixel structure as claimed in claim 1, wherein the common line is located not only between the first pixel electrode and the scan line but also between the second pixel electrode and the scan line.

4. The pixel structure as claimed in claim 1, further comprising a second capacitance upper electrode electrically connected to the second pixel electrode and the second active device, the second capacitance upper electrode being located above the common line to form a second storage capacitor.

5. The pixel structure as claimed in claim 1, wherein the first pixel electrode comprises a plurality of first stripe portions, the second pixel electrode comprises a plurality of second stripe portions, the first stripe portions and the second stripe portions are alternately arranged, extension directions of the first stripe portions and the second stripe portions are conformally along the first data line and the second data line substantially, and the first data line and the second data line have a zigzag shape, respectively.

6. The pixel structure as claimed in claim 1, wherein the first pixel electrode comprises a plurality of first stripe portions, the second pixel electrode comprises a plurality of second stripe portions, the first stripe portions and the second stripe portions are alternately arranged, and the first stripe portions and the second stripe portions are not parallel to the first data line and the second data line.

7. The pixel structure as claimed in claim 6, wherein the first pixel electrode further comprises:
a first longitudinal connection portion located between the first stripe portions and the first data line, the first longitudinal connection portion being substantially parallel to the first data line; and
at least one first transversal connection portion connected to the first longitudinal connection portion, the at least one first transversal connection portion being substantially parallel to the scan line, a portion of the first stripe portions being connected to the first longitudinal connection portion, wherein the common line has a first branch overlapped with a whole side edge of the first longitudinal connection portion.

8. The pixel structure as claimed in claim 6, wherein the second pixel electrode further comprises:
a second longitudinal connection portion located between the second stripe portions and the second data line, the second longitudinal connection portion being substantially parallel to the second data line; and
a second transversal connection portion connected to the second longitudinal connection portion, the second transversal connection portion being substantially parallel to the scan line and dividing the pixel structure into two alignment regions, a portion of the second stripe portions being connected to the second longitudinal connection portion, the other portion of the second stripe portions being connected to the second transversal connection portion.

9. The pixel structure as claimed in claim 8, wherein the common line has a second branch overlapped with a whole side edge of the second longitudinal connection portion.

10. The pixel structure as claimed in claim 9, wherein the common line further has a transversal branch overlapped with the second transversal connection portion and connected to the second branch.

11. The pixel structure as claimed in claim 1, wherein the common line and the scan line being adjacent to each other.

12. The pixel structure as claimed in claim 1, wherein the first capacitance upper electrode is integrally formed with a terminal of the first active device.

13. A pixel structure, comprising:
a scan line;
a first data line intersecting the scan line;
a second data line intersecting the scan line;
a first active device electrically connected to the first data line;
a second active device electrically connected to the second data line;
a first pixel electrode electrically connected to the first active device;
a second pixel electrode electrically connected to the second active device, the first pixel electrode and the second pixel electrode being located between the first data line and the second data line, a difference between a first voltage of the first pixel electrode and a second voltage of the second pixel electrode constituting a driving electric field to drive a display medium;
a common line and the scan line being adjacent to each other; and
a first capacitance upper electrode electrically connected to the first pixel electrode though a first contact window and also electrically connected to the first active device, wherein the first capacitance upper electrode is integrally formed with a terminal of the first active device, and wherein the first capacitance upper electrode is located above the common line to form a first storage capacitor.

* * * * *